United States Patent
Namikawa (10) Patent No.: US 12,153,029 B2
(45) Date of Patent: Nov. 26, 2024

(54) PREPARATIVE LIQUID CHROMATOGRAPH APPARATUS AND METHOD FOR ASSISTING DETERMINATION OF PREPARATIVE SEPARATION CONDITIONS

(71) Applicant: SHIMADZU CORPORATION, Kyoto (JP)

(72) Inventor: Minoru Namikawa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 253 days.

(21) Appl. No.: 18/075,004

(22) Filed: Dec. 5, 2022

(65) Prior Publication Data

US 2023/0273162 A1 Aug. 31, 2023

(30) Foreign Application Priority Data

Feb. 25, 2022 (JP) ................ 2022-028475

(51) Int. Cl.
*G01N 30/86* (2006.01)
*G01N 30/14* (2006.01)
*G01N 30/80* (2006.01)
*G01N 30/02* (2006.01)

(52) U.S. Cl.
CPC ......... *G01N 30/8651* (2013.01); *G01N 30/14* (2013.01); *G01N 30/80* (2013.01); *G01N 2030/027* (2013.01)

(58) Field of Classification Search
None
See application file for complete search history.

(56) References Cited

U.S. PATENT DOCUMENTS

| 10,254,254 B2 * | 4/2019 | Terada ................... G01N 30/24 |
| 2010/0050737 A1 * | 3/2010 | Wolters .............. G01N 30/8665 |
| | | 73/23.35 |
| 2017/0234839 A1 | 8/2017 | Terada et al. |

FOREIGN PATENT DOCUMENTS

| JP | 2010-14559 A | 1/2010 |
| WO | 2016/021715 A1 | 2/2016 |

* cited by examiner

*Primary Examiner* — Brandi N Hopkins
*Assistant Examiner* — Nigel H Plumb
(74) *Attorney, Agent, or Firm* — Renner, Otto, Boisselle & Sklar, LLP (57) ABSTRACT

In a preparative liquid chromatograph apparatus where a sample containing compounds temporally separated from each other by LC is introduced into a detector and a fraction collector to collect fractions of the sample each containing one or more compounds. A result storage section stores analysis results obtained for a plurality of samples by performing, for each identical sample, LC analyses under different separation conditions. A display-target selection receiver displays an analysis result display screen having a plurality of result display areas for individually displaying results of different LC analyses and a selection indication area for allowing a user operation for selecting one sample from a plurality of samples, and receives the user operation in the selection indication area. An analysis result display processor retrieves, from the result storage section, a plurality of analysis results corresponding to the selected sample, and displays the analysis results in the result display areas.

6 Claims, 6 Drawing Sheets

PREPARATIVE LIQUID CHROMATOGRAPH APPARATUS AND METHOD FOR ASSISTING DETERMINATION OF PREPARATIVE SEPARATION CONDITIONS

TECHNICAL FIELD

The present invention relates to a preparative liquid chromatograph apparatus and a method for assisting the determination of the preparative separation conditions in the same apparatus. The "preparative liquid chromatograph apparatus" in the present description naturally includes a common type of preparative LC apparatus which employs an absorptiometer as a detector, and it also includes other types of preparative liquid chromatograph apparatuses in which a detector whose principle is different from absorbance detection, such as an evaporative light scattering detector (ELSD) or mass spectrometer (MS), is solely or additionally used.

BACKGROUND ART

A preparative liquid chromatograph apparatus (which may hereinafter be called the "preparative LC apparatus") which uses a liquid chromatograph apparatus to collect one or more fractions of a liquid sample, with each fraction containing one or more compounds contained in the liquid sample, has been commonly known (for example, see Patent Literature 1).

In order to achieve a preparative separation of a target compound with a high level of efficiency so as to minimize the amount of impurity in the fraction in the preparative LC apparatus, it is preferable to perform the component separation so that a chromatogram peak originating from the target compound is formed with a sufficient height (or with a sufficient area), and that the peak has a satisfactory shape (e.g., close to a Gaussian waveform). To this end, it is necessary to appropriately set the preparative separation conditions, i.e., the separation conditions in the LC analysis, for each sample, or for each target compound. Preparative separation conditions include the type of column, kind of mobile phase, flow rate or flow velocity of the mobile phase, and other parameters. Patent Literature 1 discloses an apparatus capable of determining suitable preparative separation conditions for a target sample, based on a chromatogram obtained by performing an LC analysis on the target sample in a preparative-separation-condition search mode.

Although the previously described type of technique enables an automatic search for the analysis conditions, an operator is often required to compare analysis results and make judgments in order to determine more appropriate preparative separation conditions or obtain preliminary information necessary for the automatic search. For LC apparatuses, it is often the case that the pH of the mobile phase significantly affects the ease of occurrence of a peak and the shape of the peak. Therefore, in some cases, an LC analysis using an acidic mobile phase and one using a basic (alkaline) mobile phase are individually performed on the same target compound for the determination of the preparative separation conditions, and the thereby obtained analysis results, such as chromatograms or mass spectra, are visually compared by an operator.

CITATION LIST

Patent Literature

Patent Literature 1: WO 2016/021715 A
Patent Literature 2: JP 2010-14559 A

SUMMARY OF INVENTION

Technical Problem

When a plurality of analysis results obtained under different preparative separation conditions (typically, at different pH values of the mobile phase) for the same sample are to be compared with each other, it will be convenient if the plurality of chromatograms or mass spectra to be compared with each other are arranged next to each other on the same display screen. Similarly, in the case of a common type of LC apparatus which is not a preparative LC apparatus, the user often wants to compare analysis results on different samples. Therefore, control-and-processing software applications used in conventional LC apparatuses, including preparative LC apparatuses, are provided with the function of arranging a plurality of analysis results on the same screen so that the results of different LC analyses can be easily compared.

However, in order to display a plurality of analysis results on the same sample under different preparative separation conditions on the same screen by this type of conventional function, the operator must perform, for each of the plurality of result display areas on the screen, an operation for selecting and indicating a desired sample from a plurality of samples for which the LC analysis has been completed, as well as an operation for selecting and indicating an analysis result which should be displayed among the plurality of analysis results related to that sample. Therefore, in particular, when there are a plurality of samples for which the task of comparing a plurality of analysis results obtained under different preparative separation conditions needs to be sequentially performed, the task will be considerably complex and inefficient. Additionally, the operator may possibly make an incorrect operation and unintentionally display analysis results on different samples. This makes it difficult to ensure the reliability of the comparing task.

The present invention has been developed to solve these problems. Its primary objective is to provide a preparative liquid chromatograph apparatus and a method for assisting the determination of preparative separation conditions in which a plurality of analysis results obtained by performing an LC analysis on the same sample under different separation conditions, such as the use of an acidic or basic mobile phase, can be displayed in an easily comparable form by simple and the most error-free operations by a user.

Solution to Problem

One mode of the preparative liquid chromatograph apparatus according to the present invention developed for solving the previously described problem is a preparative liquid chromatograph apparatus in which a sample containing compounds separated from each other in a temporal direction by a liquid chromatograph is introduced into a detector and a fraction collector, and one or more fractions of the sample are collected by the fraction collector based on a detection result by the detector, with each fraction containing a compound or a compound group including a plurality of compounds, the preparative liquid chromatograph apparatus including:

a result storage section configured to store analysis results obtained for a plurality of samples by performing, for each identical sample, liquid chromatographic analyses under a plurality of different separation conditions;

a display-target selection receiver configured to display, on a display section, an analysis result display screen on which a plurality of result display areas for individually displaying analysis results obtained by different liquid chromatographic analyses, and a selection indication area for allowing a user to select one desired sample from a plurality of samples, are arranged, and to receive an operation for selecting one sample by a user in the selection indication area of the analysis result display screen displayed; and an analysis result display processor configured to retrieve, from the result storage section, a plurality of analysis results corresponding to one sample received by the display-target selection receiver, and to display each of the plurality of analysis results in each of the plurality of result display areas of the analysis result display screen.

One mode of the method for assisting the determination of preparative separation conditions according to the present invention developed for solving the previously described problem is a method for assisting the task of determining preparative separation conditions in the previously described mode of the preparative liquid chromatograph apparatus according to the present invention, the method including:

a measurement step for performing, for a plurality of samples, liquid chromatographic analyses using a plurality of different mobile phases for each identical sample, and for saving obtained analysis results in the result storage section;

a display-target selection receiving step for receiving an operation for selecting one sample by a user in the selection indication area on the analysis result display screen displayed on the display section; and an analysis result display step for retrieving, from the result storage section, a plurality of analysis results obtained by using different mobile phases corresponding to one sample received in the display-target selection receiving step, and for displaying each of the plurality of analysis results in each of the plurality of result display areas of the analysis result display screen.

Advantageous Effects of Invention

In the previously described modes of the preparative liquid chromatograph apparatus and the method for assisting the determination of preparative separation conditions according to the present invention, when an operation for selecting one sample is performed in the selection indication area by a user, a plurality of analysis results corresponding to that sample are displayed in the plurality of result display areas of the analysis result display screen.

Accordingly, by the previously described modes of the preparative liquid chromatograph apparatus and the method for assisting the determination of preparative separation conditions according to the present invention, a plurality of analysis results obtained for the same sample under different separation conditions, such as an acidic or basic mobile phase, can be displayed in an easily comparable form by simple and the most error-free operations by a user. This improves the efficiency of the task of determining or searching for the preparative separation conditions. Appropriate preparative separation conditions can be determined with a reduced number of operational errors.

DESCRIPTION OF EMBODIMENTS

One embodiment of the preparative LC apparatus according to the present invention and the method for assisting the determination of preparative separation conditions in the same apparatus is hereinafter described referring to the attached drawings.

Figure 1:
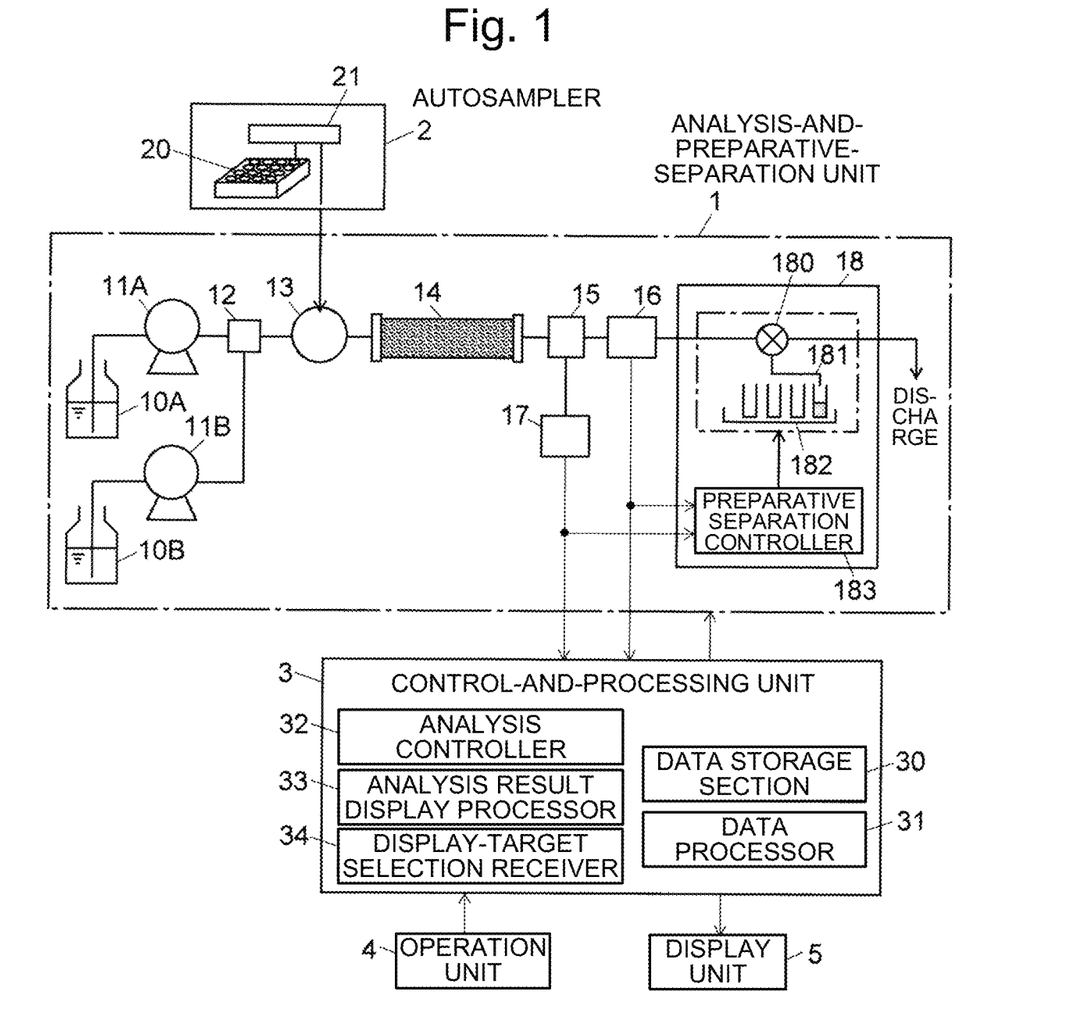
FIG. 1 is a schematic block configuration diagram of a preparative LC apparatus as one embodiment of the present invention.

FIG. 1 is a schematic block configuration diagram of the preparative LC apparatus according to the present embodiment.

This preparative LC apparatus includes an analysis-and-preparative-separation unit 1, autosampler 2, control-and-processing unit 3, operation unit 4 and display unit 5.

The analysis-and-preparative-separation unit 1 includes a first mobile-phase container 10A, second mobile-phase container 10B, first liquid-sending pump 11A, second liquid-sending pump 11B, mixer 12, injector 13, column 14, splitter 15, first detector 16, second detector 17 and fraction collector 18.

The fraction collector 18 is a device for collecting fractions of an eluate from the exit end of the column 14 and putting them into a plurality of fraction containers. This device includes a preparative separation valve 180, a dispensing nozzle 181 equipped with a transfer mechanism, a tray 182 carrying a plurality of preparative separation containers, and a preparative separation controller 183.

The autosampler 2 includes a vial plate 20 configured to hold a large number of vials each of which contains a sample, and a suction-and-sending mechanism 21 configured to select one of the vials, suction a sample from the selected vial and supply it to the injector 13.

The control-and-processing unit 3 mainly has the functions of controlling the operations of the analysis-and-preparative-separation unit 1 and the autosampler 2 as well as performing the data processing based on the detection signals received from the first and second detectors 16 and 17. Furthermore, as will be described later, the control-and-processing unit 3 also has the function of assisting the user (operator) in determining the preparative separation conditions, by providing the user with appropriate information and an easy-to-operate user interface for determining the preparative separation conditions. The control-and-processing unit 3 includes a data storage section 30, data processor 31, analysis controller 32, analysis result display processor 33, display-target selection receiver 34 and other components as its functional blocks.

The control-and-processing unit 3 can be configured by using a personal computer (PC) including a CPU, RAM, ROM and other devices as a hardware resource, with at least some of its functions realized by executing, on the PC, dedicated control-and-processing software (computer program) installed on the same PC.

The computer program can be offered to users in the form of a non-transitory computer-readable record medium holding the program, such as a CD-ROM, DVD-ROM, memory card, or USB memory (dongle). The program may also be offered to users in the form of data transferred through the Internet or similar communication networks. The program can also be preinstalled on a PC (or more exactly, on a storage device as a component of a PC) as a part of a system before a user purchases the system.

An operation of the preparative separation in the preparative LC apparatus according to the present embodiment is hereinafter described. Before the preparative separation is actually performed, the preparative separation conditions including the type of column, kind of mobile phase, flow rate or flow velocity of the mobile phase, and other parameters should already be determined, and the column and the mobile phase should be prepared accordingly, while the preparative separation conditions should be set in the analysis controller 32.

A user issues a command to initiate the preparative separation from the operation unit 4. Upon receiving this command, the analysis controller 32 begins to control the analysis-and-preparative-separation unit 1 and the autosampler 2 according to the set preparative separation conditions. Under this control, the liquid-sending pumps 11A and 11B suction the mobile phases from the mobile phase containers 10A and 10B, respectively, and supply them through the mixer 12 and the injector 13 to the column 14. Depending on the preparative separation conditions, the liquid-sending pumps 11A and 11B may be controlled so that the flow velocity of each mobile phase changes with time. By this operation, a high-pressure gradient liquid supply in which the component ratio of the first and second mobile phases changes with time can be realized. Understandably, it is also possible to use a single mobile phase or supply a plurality of mobile phases with a fixed component ratio instead of performing a gradient liquid supply.

Based on an instruction from the analysis controller 31, the suction-and-sending mechanism 21 in the autosampler 2 sequentially selects the plurality of vials prepared on the vial plate 20, suctions a predetermined amount of sample from the selected vial, and send it to the injector 13. The injector 13 injects the sample into the mobile phase at a predetermined timing. The injected sample is carried by the flow of the mobile phase and introduced into the column 14. While passing through the column 14, the various compounds in the sample are temporally separated from each other, and an eluate containing those compounds flows out of the exit end of the column 14.

An extremely small amount of eluate is split from the eluate flowing out of the end of the column 14 by the splitter 15 and sent to the second detector 17, while the remaining portion is introduced into the first detector 16. In order to smoothly send the trace amount of solution split by the splitter 15 to the second detector 17, a liquid-sending pump for supplying a makeup solvent may be added as needed. For example, a configuration described in Patent Literature 2 can be used for this configuration.

In the present embodiment, the first detector 16 is an absorption detector; more specifically, an ultraviolet-visible absorption spectrophotometer is used in this case. The absorption wavelength of the target compound is previously known. The first detector 16 produces a detection signal representing the degree of the absorption of light at the predetermined wavelength by the target compound in the solution. The temporal change of this detection signal is an absorption chromatogram. A peak corresponding to the concentration (amount) of the target compound appears in this absorption chromatogram. This detection signal is fed to the control-and-processing unit 3 and the preparative separation controller 183. Since the first detector 16 is a non-destructive detector, the solution which has passed through the detection stage is directly introduced into the fraction collector 18.

On the other hand, the second detector 17 is a destructive detector; more specifically, a quadrupole mass spectrometer including an atmospheric pressure ion source is used in this case. The mass-to-charge ratio (m/z) of an ion corresponding to the target compound is previously known. The second detector 17 produces, for example, a detection signal representing the intensity of the ion originating from the target compound in the solution. The temporal change of this detection signal is an extracted ion chromatogram. As in the absorption chromatogram, a peak corresponding to the concentration (amount) of the target compound appears in this extracted ion chromatogram. This detection signal is also fed to the control-and-processing unit 3 and the preparative separation controller 183.

The preparative separation controller 183 controls the open/close operation of the preparative separation valve 180 and the transfer operation of the dispensing nozzle 181 based on one or both of the detection signals produced by the first and second detectors 16 and 17 as well as the control signal from the control-and-processing unit 3. By this control, the fraction collector 18 separates the eluate containing a plurality of target compounds into fractions and individually put them into separate preparative separation containers. The detection signals produced by the first and second detectors 16 and 17 and sent to the control-and-processing unit 3 are digitized and saved in the data storage section 30. The data processor 31 performs waveform processing on the collected data to create a chromatogram or mass spectrum, relates the obtained data to the original data and stores them in the data storage section 30.

In place of the configuration in which the splitter 15 is located before the first detector 16, a configuration in which the second detector 17 is located after the fraction collector 18 may be adopted, as disclosed in Patent Literature 1. Providing two detectors is not essential; the minimum requirement is to provide at least one detector.

In FIG. 1, the functions of the preparative separation controller 183 included in the fraction collector 18 may be incorporated into the control-and-processing unit 3.

In order to efficiently perform the previously described preparative separation of the target compounds with a high level of purity, it is necessary to appropriately determine the preparative separation conditions. The kind of mobile phase, and particularly the pH of the mobile phase, significantly affects how a chromatographic peak will appear and what shape it will have. Therefore, the task of searching for and determine preparative separation conditions often includes performing, for each target compound, an LC analysis using each of the acidic and basic mobile phases and comparing the thereby obtained results. The preparative LC apparatus according to the present embodiment has functions for assisting the task of determining preparative separation conditions in such a case. The tasks to be performed by the user and the corresponding operations of the apparatus are hereinafter described.

When searching for and determining the pH of the mobile phase, the user prepares a plurality of vials on the vial plate 20, with each vial holding a sample for creating preparative separation conditions that contains a different target compound. The user subsequently registers sample numbers and compound names by entering each vial number with the name of the corresponding target compound from the operation unit 4. The user also prepares an acidic mobile phase and a basic mobile phase. Then, the user performs a predetermined operation using the operation unit 4, whereupon the analysis controller 32 begins operating the analysis-and-preparative-separation unit 1 and the autosampler 2 to carry out an LC analysis using each of the acidic and basic mobile phases for each target compound, as an LC analysis for searching for preparative separation conditions. The data thereby obtained is stored in the data storage section 30.

Some compounds are likely to form positive ions, while others are likely to form negative ions. These tendencies are affected by the pH of the solvent. Accordingly, in the LC analysis for searching for preparative separation conditions, the second detector 17, which is the quadrupole mass spectrometer, is operated so as to repeatedly perform a selected ion monitoring (SIM) measurement in positive ionization mode and a similar SIM measurement in negative ionization mode, both of which are targeted at the m/z value corresponding to the target compound, as well as a scan measurement for a predetermined m/z range. The scan measurement is performed, for example, to check for an unintended impurity being eluted and overlapping the target compound. Meanwhile, the first detector 16, which is the ultraviolet-visible spectrophotometer, is operated so as to repeatedly perform an absorbance measurement for a wavelength corresponding to the target compound.

Figure 2:
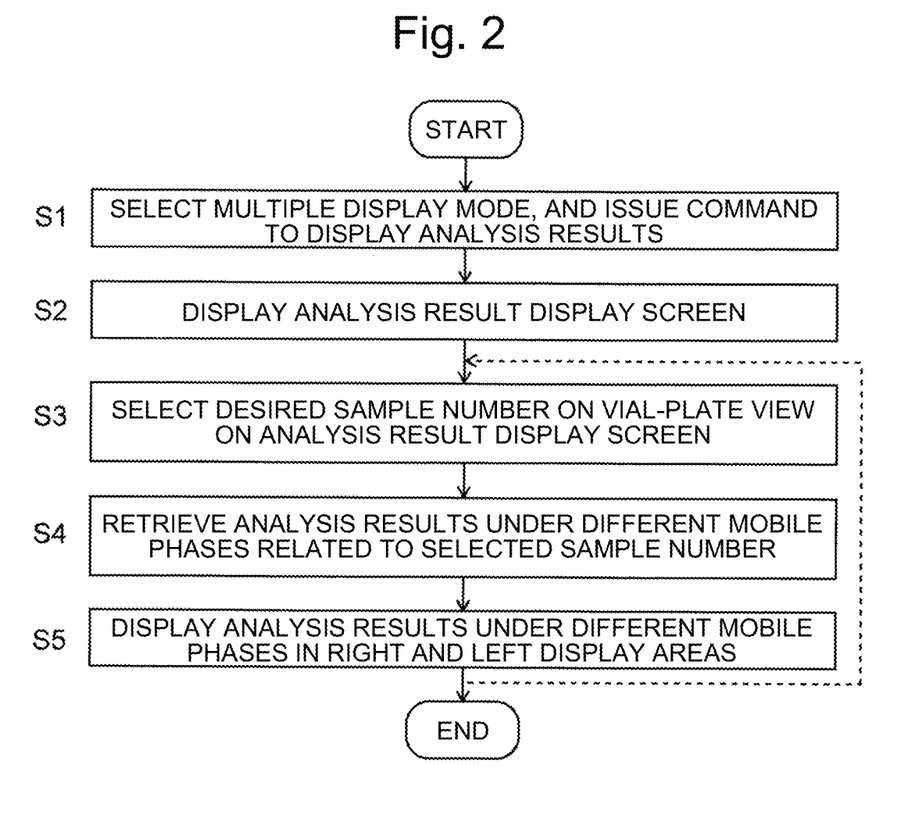
FIG. 2 is a flowchart showing the procedure for displaying, on an analysis result display screen, a plurality of analysis results on the same sample to search for and determine preparative separation conditions in the preparative LC apparatus according to the present embodiment.

As a result of the LC analysis for searching for preparative separation conditions, the data which form an absorption chromatogram, extracted ion chromatogram in positive ionization mode, extracted ion chromatogram in negative ionization mode and mass spectrum, under each of the acidic and basic mobile phases, are saved for each vial containing a different target compound in the data storage section 30. After those kinds of data have been collected, the user weighs the results of the LC analyses with each other. FIG. 2 is a flowchart showing the procedure for displaying a plurality of analysis results related to the same sample on an analysis result display screen so as to allow the user to search for and determine preparative separation conditions.

The user performs a predetermined operation with the operation unit 4 to issue a command to display analysis results. There are two options for the display of analysis results: a single display mode for showing an analysis result of one sample and a multiple display mode for displaying analysis results of a plurality of samples (in the present example, two samples, although there may be three or more) side by side. For the present case, the multiple display mode should be selected (Step S1).

Figure 4:
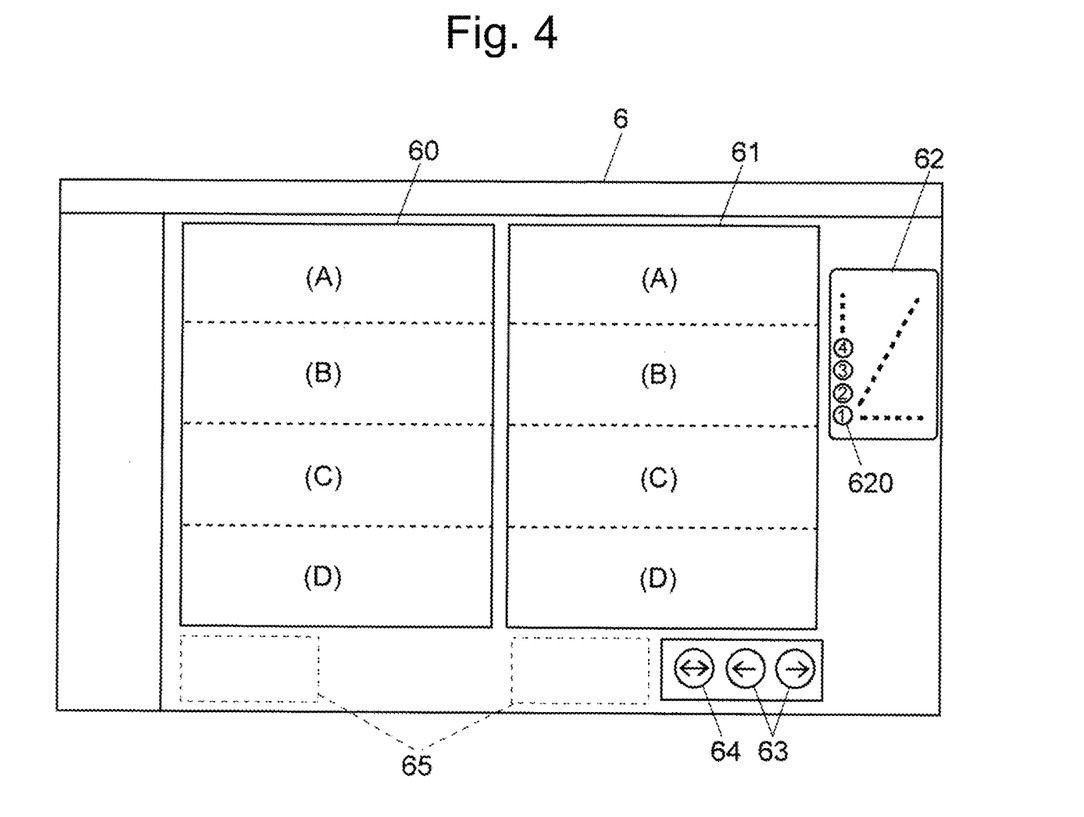
FIG. 4 is a diagram showing a schematic arrangement on the analysis result display screen in the preparative LC apparatus according to the present embodiment.

In response to this operation, the analysis result display processor 33 displays an analysis result display screen 6 as schematically shown in FIG. 4 on the display unit 5 (Step S2). As shown in FIG. 4, the analysis result display screen 6 includes two result display areas 60 and 61 in left and right parts of the approximately central area of the screen, and a vial-plate view 62 on the right side of those areas. The vial-plate view 62 is a model view of the vial plate 20 of the autosampler 2 observed roughly from above. Each circular mark 620 corresponds to one vial. The figure inside the mark 620 shows the vial number.

In the present example, each of the result display areas 60 and 61 is divided into four sections (A), (B), (C) and (D) in the vertical direction. Section (A) shows an absorption chromatogram (in FIG. 5, "UV chromatogram") based on the detection signal produced by the first detector 16. Section (B) shows an extracted ion chromatogram in positive ionization mode (in FIG. 5, "MS chromatogram (+)") based on the detection signal produced by the second detector 17. Section (C) shows an extracted ion chromatogram in negative ionization mode (in FIG. 5, "MS chromatogram (−)") based on the detection signal produced by the second detector 17. Section (D) shows a mass spectrum based on the detection signal produced by the second detector 17. It should be noted that the item to be displayed in each section and the order of those items can be selected in another screen. The important point is that the same item of information is shown in each section of the left result display area 60 and the right result display area 61.

Located below the result display areas 60 and 61 is a sample information area 65 for showing the name of the data file, date and time of the analysis, sample ID, and other pieces of information related to the analysis results shown in the result display areas 60 and 61. Furthermore, right and left arrow buttons 63 and a double-arrow button 64 are arranged below the right result display area 61. Other display areas and operation buttons can also be arranged in the analysis result display screen 6, although those components are omitted in the drawing.

The analysis result display screen 6 is a screen suited for comparing a plurality of analysis results; it is not intended to be always used for comparing analysis results obtained for the same sample under different mobile phases. Accordingly, the two result display areas 60 and 61 of the analysis result display screen 6 can also be used not only for displaying two different analysis results related to the same sample or but also for displaying two different analysis results related to two different samples.

When the user wants to compare two different analysis results related to the same sample, the user manipulates the operation unit 4 to move the cursor onto the circular mark 620 having the desired sample number on the vial-plate view 62 and indicates the selection of the sample number, for example, by the left-click operation with the pointing device (Step S3). The display-target selection receiver 34 receives this operation, and the analysis result display processor 33 retrieves, from the data storage section 30, the data of the analysis results related to the selected sample number, or specifically, the information of the chromatograms and the mass spectra based on the data obtained by LC analyses under different mobile phases (Step S4). The retrieved chromatograms and the mass spectra are displayed in the corresponding sections of the result display areas 60 and 61 (Step S5).

Figure 5:
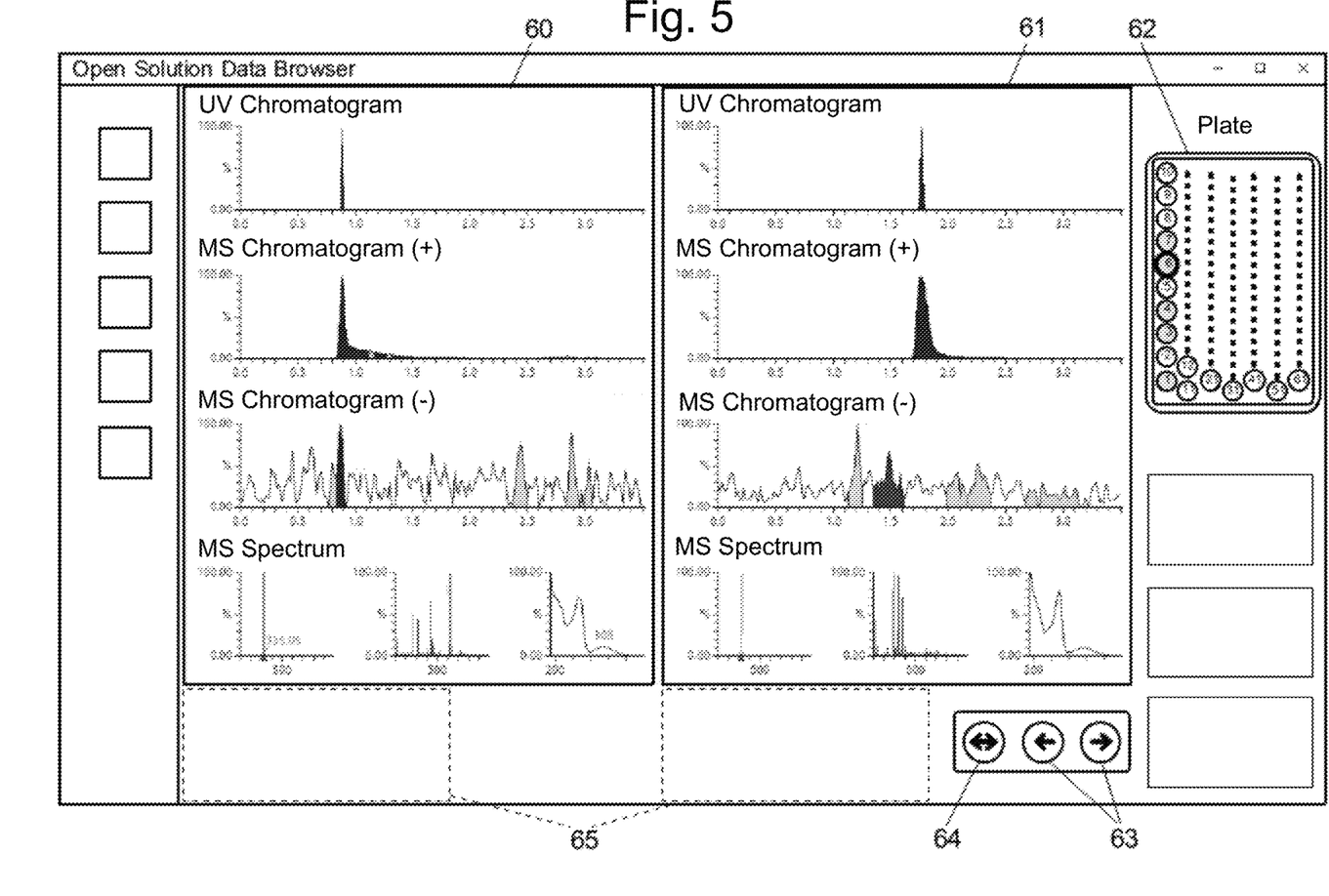
FIG. 5 is a diagram showing one example of the analysis result display screen in the preparative LC apparatus according to the present embodiment.

FIG. 5 is an example in which analysis results on the same sample under acidic and basic mobile phases are shown. The circular mark 620 with sample number "6" on the vial-plate view 62 is highlighted, indicating the selection of this sample number. Since the same kind of analysis results are arranged side by side in the same section of the result display areas 60 and 61, the user can easily compare those results. It is unlikely for the user to compare an incorrect pair of analysis results.

When the results obtained with the acidic and basic mobile phases are compared to search for and determine preparative separation conditions, a sample which contains only the target compound is normally used. Accordingly, it is often the case that the user wants to sequentially check analysis results of a plurality of samples in order to perform a comparative evaluation of a plurality of target compounds. In that case, as indicated by the broken line in FIG. 2, the user returns from Step S5 to Step S3 and performs an operation for selecting another sample number on the vial-plate view 62. In response to this operation, the analysis results displayed in the result display areas 60 and 61 are replaced by those corresponding to the new sample number. That is to say, the two analysis results related can be changed in an interlocked fashion by a one-click operation with the pointing device. Thus, the user can efficiently compare analysis results obtained for different target compounds under different mobile phases.

Figure 3:
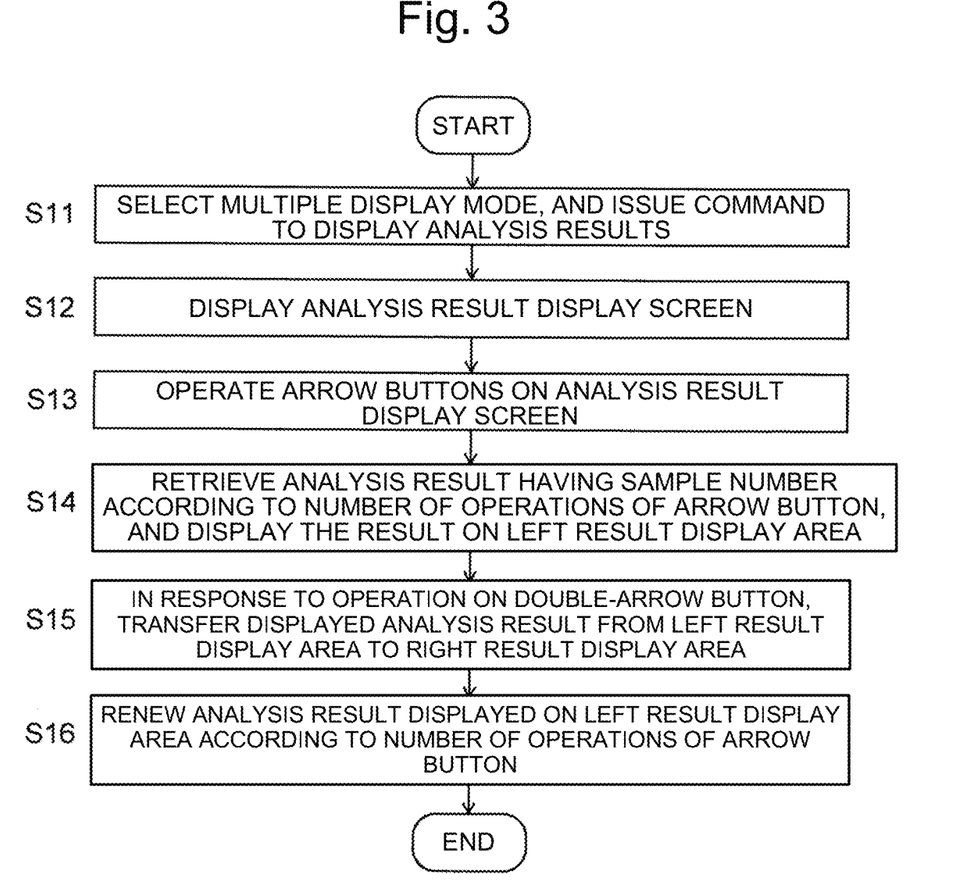
FIG. 3 is a flowchart showing the procedure for displaying, on the analysis result display screen, an analysis result for each different sample in the preparative LC apparatus according to the present embodiment.

When the user wants to compare analysis results on different samples, the user can compare the LC analysis results as follows. FIG. 3 is a flowchart showing the procedure for displaying, on the analysis result display screen, a plurality of analysis results on different samples.

In Steps S11 and S12, which are identical to the previously described Steps S1 and S2, the analysis result display screen 6, with the result display areas 60 and 61 arranged therein, is displayed on the display unit 5. The two sets of analysis results to be respectively displayed in the two result display areas 60 and 61 can be changed as follows.

The arrow buttons 63 are buttons having the function of changing the analysis result to be displayed in the left result display area 60 in FIGS. 4 and 5, while the double-arrow button 64 is a button having the function of exchanging the analysis results shown in the left and right result display areas 60 and 61. For example, when the right arrow button 63 is clicked by the user, the display-target selection receiver 34 receives the click operation, and the analysis result display processor 33 renews the sample number in ascending order with each click operation, for example. It then retrieves the analysis result corresponding to the new sample number from the data storage section 30 and shows it on the left result display area 60. It should be noted that, for example, when a plurality of analysis results obtained under different preparative separation conditions (e.g., different mobile phases) are related to one sample number as described earlier, those analysis results having the same sample number and obtained under different preparative separation conditions can be sequentially switched and displayed. Clicking the left arrow button 63 renews the sample number in reverse order to the clicking of the right arrow button 63, e.g., in descending order, and the analysis result corresponding to the new sample number is displayed in the left result display area 60 (Steps S13 and S14).

After one of the two analysis results to be compared has been displayed in the left result display area 60, the user clicks the double-arrow button 64. The display-target selection receiver 34 receives this click operation, and the analysis result display processor 33 transfers the analysis result from the left result display area 60 to the right result display area 61 (Step S15).

Subsequently, the user repeats the click operation on the right or left arrow button 63 until the other one of the two analysis results to be compared is displayed in the left result display area 60 (Step S16). Thus, by appropriately clicking on the arrow buttons 63 and the double-arrow button 64, the user can display, on the left and right result display areas 60 and 61, the analysis results of different sample numbers which should be compared with each other.

When a plurality of analysis results under different preparative separation conditions are present for one sample, i.e., for a vial of the same sample number, one of the plurality of analysis results under different preparative separation conditions can be selected as follows: The user manipulates the operation unit 4 to move the cursor onto a circular mark 620 having the desired sample number on the vial-plate view 62 and performs, for example, the right-click operation with the pointing device. The display-target selection receiver 34 receives this operation and pops up a preparative separation condition selecting window 621, as shown in FIG. 6.

Figure 6:
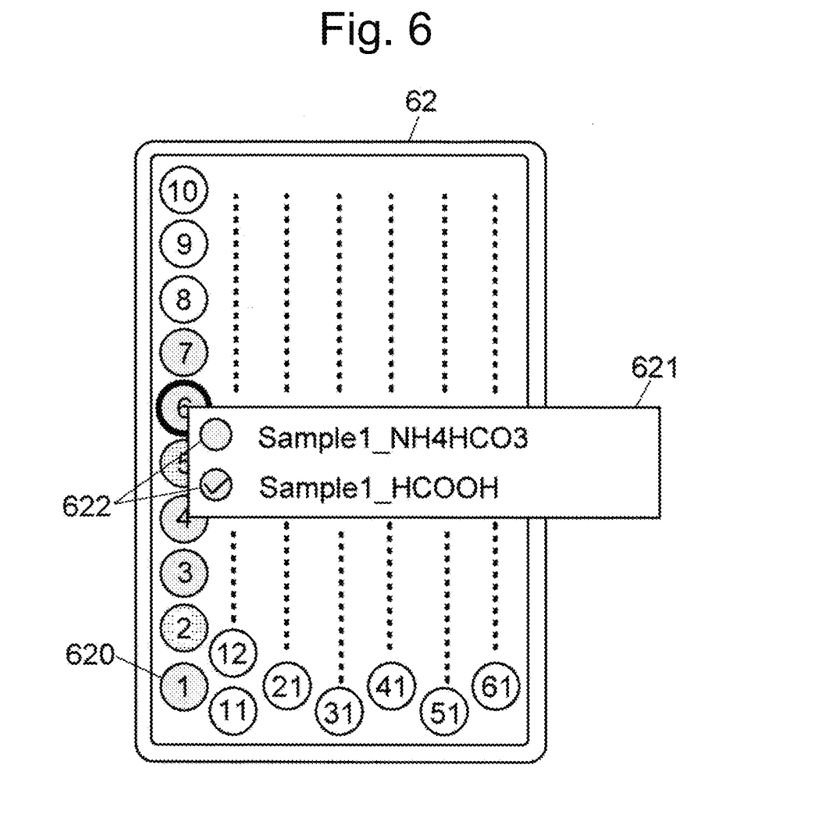
FIG. 6 is a diagram showing one example of the display when an operation has been performed on a vial-plate view on the analysis result display screen shown in FIG. 5.

The example of FIG. 6 shows that analysis results under an acidic mobile phase and a basic mobile phase were obtained for "Sample1". On the displayed popup window, the user can select one of those analysis results by checking the corresponding circular checkbox 622. In the example of FIG. 6, the analysis result under the acidic mobile phase is selected. By this selection, the analysis result can be displayed in the left result display area 60. By this operation method, it may be possible to more quickly reach and display the analysis result of the desired sample number than by clicking the arrow buttons 63 many times until the desired sample number is reached.

As described thus far, in the preparative LC apparatus according to the present embodiment, the user only needs to perform the convenient operation of selecting the desired sample number to display, side by side on the same screen, a plurality of analysis results obtained for the same sample under different mobile phases. By comparison, the task of displaying analysis results of different samples side by side on the same screen is performed by an operation totally different from the selection of a sample number. That is to say, when a plurality of analysis results are to be displayed side by side on the same analysis result display screen 6 in which a plurality of result display areas 60 and 61 are arranged, the operation for selecting the analysis results entirely changes depending on the content of the analysis results, or in other words, depending on the purpose or situation of the comparison of the analysis results. This is advantageous for the user, or particularly, for an operator insufficiently skilled in the operation, in that an incorrect operation is unlikely to occur.

In the previous embodiment, the analysis results to be compared are analysis results for the same sample under preparative separation conditions which are different as to whether an acidic or basic mobile phase is used. It is evident that the present invention can also be applied in the case of comparing analysis results which are different in terms of any other item of the various preparative separation conditions.

The previous embodiment allows for the selection of the desired sample number by a one-click operation on the vial-plate view 62. A different type of display form, such as a sample list, may also be used for a similarly convenient selecting operation. The operations on the arrow buttons 63 and the double-arrow button 64 for the selection of sample numbers and other items of information may also be replaced by different types of operations. The result display areas 60 and 61 may be vertically arranged instead of being horizontally arranged.

It should be noted that the previous embodiment and its variations described thus far are mere examples of the present invention, and any change, modification or addition appropriately made within the gist of the present invention will naturally fall within the scope of claims of the present application.

Various Modes

It is evident for a person skilled in the art that the previously described illustrative embodiments are specific examples of the following modes of the present invention.

(Clause 1) One mode of the preparative liquid chromatograph apparatus according to the present invention is a preparative liquid chromatograph apparatus in which a sample containing compounds separated from each other in a temporal direction by a liquid chromatograph is introduced into a detector and a fraction collector, and one or more fractions of the sample are collected by the fraction collector based on a detection result by the detector, with each fraction containing a compound or a compound group including a plurality of compounds, the preparative liquid chromatograph apparatus including:
- a result storage section configured to store analysis results obtained for a plurality of samples by performing, for each identical sample, liquid chromatographic analyses under a plurality of different separation conditions;
- a display-target selection receiver configured to display, on a display section, an analysis result display screen on which a plurality of result display areas for individually displaying analysis results obtained by different liquid chromatographic analyses, and a selection indication area for allowing a user to select one desired sample from a plurality of samples, are arranged, and to receive an operation for selecting one sample by a user in the selection indication area of the analysis result display screen displayed; and
- an analysis result display processor configured to retrieve, from the result storage section, a plurality of analysis results corresponding to one sample received by the display-target selection receiver, and to display each of the plurality of analysis results in each of the plurality of result display areas of the analysis result display screen.

By the preparative liquid chromatograph apparatus according to Clause 1, for example, a plurality of analysis results obtained for the same sample under different separation conditions, such as an acidic or basic mobile phase, can be displayed in an easily comparable form by simple and the most error-free operations by a user. This improves the efficiency of the task of determining or searching for the preparative separation conditions. Appropriate preparative separation conditions can be determined with a reduced number of operational errors.

(Clause 2) The preparative LC apparatus according to claim 1 may further include a sample supplier configured to select one of a plurality of sample containers prepared in a plate, take a sample from the selected sample container, and supply the sample to the liquid chromatograph, and
- the selection indication area may be a model view corresponding to an arrangement of the plurality of sample containers in the plate of the sample supplier, and the display-target selection receiver may receive an operation for specifying one sample container on the model view as the operation for selecting one sample.

A typical example of the "operation for specifying one sample container on the model view" is a click operation on a mark representing one sample container or an identification number of the sample container.

In the preparative LC according to Clause 2, a plurality of analysis results related to a sample which the user wants to check can be selected and displayed by a one-click operation. This enables the user to more easily perform the task of comparing a plurality of analysis results, and to efficiently search for and determine preparative separation conditions.

(Clause 3) In the preparative LC apparatus according to Clause 1 or 2, the display-target selection receiver may receive a second operation on the analysis result screen, where the second operation does not include the operation for selecting one sample in the selection indication area, and
- the analysis result display processor may display, according to the second operation, each of a plurality of analysis results on different samples in each of the plurality of result display areas of the analysis result display screen.

(Clause 4) In the preparative LC apparatus according to Clause 3, the second operation may be a click operation or similar operation on one or more operation elements (e.g., buttons) arranged so as not to overlap the selection indication area on the analysis result display screen.

In the preparative LC apparatus according to Clause 3 or 4, the manner of the operation for selecting analysis results to be displayed on the analysis result display screen unmistakably changes between the case of displaying a plurality of analysis results obtained for the same sample under different preparative separation conditions and the case of displaying a plurality of analysis results on different samples. This reduces the probability that the user, or particularly an operator insufficiently skilled in the operation, makes an incorrect operation and weighs a mismatched pair of analysis results.

(Clause 5) One mode of the method for assisting the determination of preparative separation conditions according to the present invention is a method for assisting the task of determining preparative separation conditions in the preparative liquid chromatograph apparatus according to one of Clauses 1-4, the method including:
- a measurement step for performing, for a plurality of samples, liquid chromatographic analyses using a plurality of different mobile phases for each identical sample, and for saving obtained analysis results in the result storage section;
- a display-target selection receiving step for receiving an operation for selecting one sample by a user in the selection indication area on the analysis result display screen displayed on the display section; and
- an analysis result display step for retrieving, from the result storage section, a plurality of analysis results obtained by using different mobile phases corresponding to one sample received in the display-target selection receiving step, and for displaying each of the plurality of analysis results in each of the plurality of result display areas of the analysis result display screen.

(Clause 6) In the method for assisting the determination of preparative separation conditions according to Clause 5, the plurality of different mobile phases may include an acidic mobile phase and a basic mobile phase.

By the method for assisting the determination of preparative separation conditions according to Clause 5 or 6, the task of comparing analysis results obtained by changing the kind of mobile phase, which is an important factor in determining the preparative separation conditions, and particularly, the task of comparing an analysis result obtained with an acidic mobile phase and one obtained with a basic mobile phase, can be efficiently performed with convenient, easy-to-understand operations.

REFERENCE SIGNS LIST

1 . . . Analysis-and-Preparative-Separation Unit
10A, 10B . . . Mobile Phase Container
11A, 11B . . . Liquid-Sending Pump
12 . . . Mixer
13 . . . Injector
14 . . . Column
15 . . . Splitter
16 . . . First Detector
17 . . . Second Detector
18 . . . Fraction Collector
180 . . . Preparative Separation Valve
181 . . . Dispensing Nozzle
182 . . . Tray
183 . . . Preparative Separation Controller
2 . . . Autosampler
20 . . . Vial Plate
21 . . . Suction-and-Sending Mechanism
3 . . . Control-and-Processing Unit
30 . . . Data Storage Section
31 . . . Data Processor
32 . . . Analysis Controller
33 . . . Analysis Result Display Processor
34 . . . Display-Target Selection Receiver
4 . . . Operation Unit
5 . . . Display Unit
6 . . . Analysis Result Display Screen
60, 61 . . . Result Display Area
62 . . . Vial-Plate View
620 . . . Mark
63 . . . Arrow Button
64 . . . Double-Arrow Button
65 . . . Sample Information Area

The invention claimed is:

1. A preparative liquid chromatograph apparatus in which a sample containing compounds separated from each other in a temporal direction by a liquid chromatograph is introduced into a detector and a fraction collector, and one or more fractions of the sample are collected by the fraction collector based on a detection result by the detector, with each fraction containing a compound or a compound group including a plurality of compounds, the preparative liquid chromatograph apparatus comprising:

a result storage section configured to store analysis results obtained for a plurality of samples by performing, for each identical sample, liquid chromatographic analyses under a plurality of different separation conditions;

a display-target selection receiver configured to display, on a display section, an analysis result display screen on which a plurality of result display areas for individually displaying analysis results obtained by different liquid chromatographic analyses, and a selection indication area for allowing a user to select one desired sample from a plurality of samples, are arranged, and to receive an operation for selecting one sample by a user in the selection indication area of the analysis result display screen displayed; and an analysis result display processor configured to retrieve, from the result storage section, a plurality of analysis results corresponding to one sample received by the display-target selection receiver, and to display each of the plurality of analysis results in each of the plurality of result display areas of the analysis result display screen.

2. The preparative liquid chromatograph apparatus according to claim 1, further comprising a sample supplier configured to select one of a plurality of sample containers prepared in a plate, take a sample from the selected sample container, and supply the sample to the liquid chromatograph, wherein the selection indication area is a model view corresponding to an arrangement of the plurality of sample containers in the plate of the sample supplier, and the display-target selection receiver receives an operation for specifying one sample container on the model view as the operation for selecting one sample.

3. The preparative liquid chromatograph apparatus according to claim 1, wherein:

the display-target selection receiver receives a second operation on the analysis result screen, where the second operation does not include the operation for selecting one sample in the selection indication area, and the analysis result display processor displays, according to the second operation, each of a plurality of analysis results on different samples in each of the plurality of result display areas of the analysis result display screen.

4. The preparative liquid chromatograph apparatus according to claim 3, wherein the second operation is an operation on one or more operation elements arranged so as not to overlap the selection indication area on the analysis result display screen.

5. A preparative separation condition determination method for assisting a task of determining preparative separation conditions in the preparative liquid chromatograph apparatus according to claim 1, the method comprising:

a measurement step for performing, for a plurality of samples, liquid chromatographic analyses using a plurality of different mobile phases for each identical sample, and for saving obtained analysis results in the result storage section;

a display-target selection receiving step for receiving an operation for selecting one sample by a user in the selection indication area on the analysis result display screen displayed on the display section; and an analysis result display step for retrieving, from the result storage section, a plurality of analysis results obtained by using different mobile phases corresponding to one sample received in the display-target selection receiving step, and for displaying each of the plurality of analysis results in each of the plurality of result display areas of the analysis result display screen.

6. The preparative separation condition determination method according to claim 5, wherein the plurality of different mobile phases includes an acidic mobile phase and a basic mobile phase.

* * * * *